Figure 1:
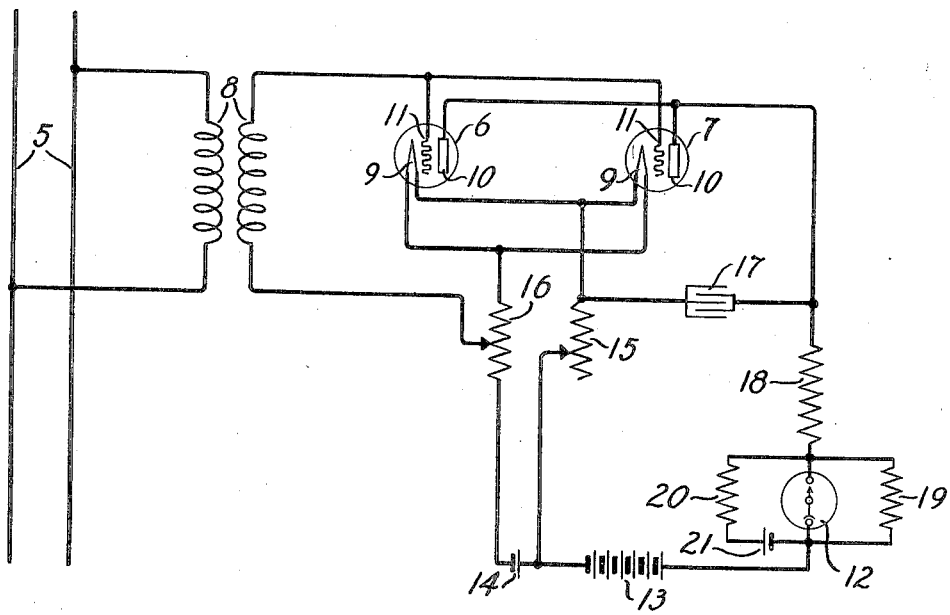

Jan. 20, 1925.

E. L. NELSON 1,523,827

TRANSMISSION CIRCUITS

Filed Aug. 31, 1922

Inventor
Edward L. Nelson
by Joel Ch. Palmer
Atty.

Patented Jan. 20, 1925.

1,523,827

UNITED STATES PATENT OFFICE.

EDWARD L. NELSON, OF EAST ORANGE, NEW JERSEY, ASSIGNOR TO WESTERN ELECTRIC COMPANY, INCORPORATED, OF NEW YORK, N. Y., A CORPORATION OF NEW YORK.

TRANSMISSION CIRCUITS.

Application filed August 31, 1922. Serial No. 585,357.

*To all whom it may concern:*

Be it known that I, EDWARD L. NELSON, a citizen of the United States, residing at East Orange, in the county of Essex, State of New Jersey, have invented certain new and useful Improvements in Transmission Circuits, of which the following is a full, clear, concise, and exact description.

This invention relates to transmission systems, particularly transmission testing or service observing systems.

An object of the invention is to provide an improved method of measuring alternating current quantities.

Another object is to determine the strength of signaling potentials in a transmission line.

Another object is to provide an amplifier circuit, working into a direct current measuring instrument which will depart from zero scale deflection only when alternating current potentials are impressed on the input terminals of the amplifier.

In accordance with the form of this invention hereinafter described in detail, these objects are accomplished by inductively coupling across the signaling line under test a unidirectional device having a substantially infinite input impedance, such as a vacuum tube amplifier of the three electrode type. The output circuit of the device includes, in series with the usual output circuit source of voltage, a direct current measuring instrument and impedance elements suitably chosen and arranged to make the measuring instrument highly damped. Means are also provided whereby the instrument is arranged to give zero scale deflection in the absence of signaling currents in the line under test.

With such an arrangement, speech voltages for example, impressed on the input terminals of the three electrode amplifier, will increase the space current, and the needle of the meter will oscillate over the scale at syllable frequency. The amplitude of the oscillations will be a function of the voltage impressed on the amplifier, or the speech level, at the point in the line where the apparatus is connected. By observing the average position of the needle and its movement a reasonably accurate indication of the speech level may be obtained. The indicator, for example, may be connected to the line at a point beyond the gain controlling element so that the strength of the signaling potential may be varied until the reading taken on the measuring instrument indicates that the speech level is at the desired height. The accuracy obtained by this arrangement is considerably higher than that possible by direct observation, for example, with the ear using only a telephone receiver. Experience has shown that for the purpose of adjusting the gain in a signaling line, the judgment of the operator reached after listening to a few seconds conversation cannot always be relied upon as accurate. Especially is this true in connection with radio transmitting equipment, which, as power apparatus, must be operated with some consideration for efficiency and will not admit of wide variations in load.

Figure 2:
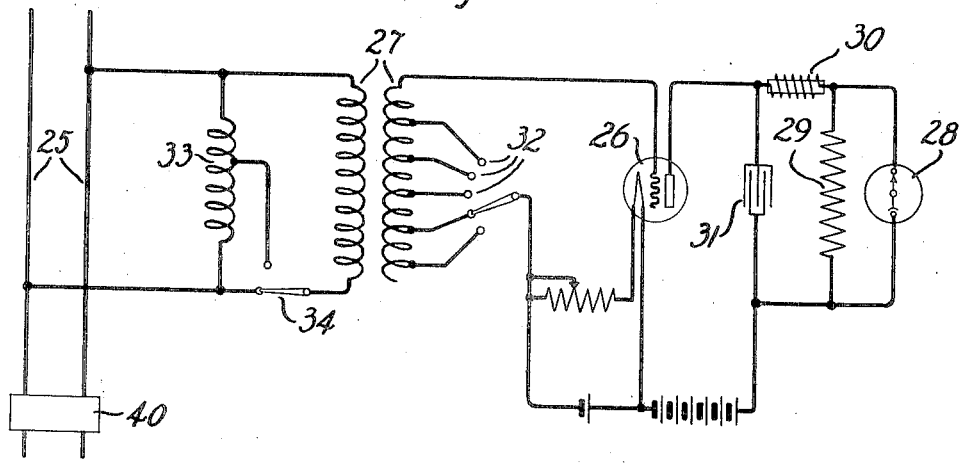

In the drawing Figure 1 represents an embodiment of one form of the invention, and Figure 2 represents a modification thereof.

Referring in detail to the drawing, 5—5 represents a signaling line across which are connected one or more electric discharge devices 6 and 7 through a transformer 8. Devices 6 and 7 preferably are of the type having substantially an infinite input impedance so that substantially no current will flow through the windings of transformer 8 and, as a consequence, the devices will require very little input energy for their operation. They will, therefore, absorb a negligible amount of energy from the signaling line. The well known vacuum tube amplifier of the three electrode type is a suitable device for use in this connection. Devices 6 and 7 are each shown to be of the three electrode type vacuum tube amplifier, each comprising a cathode 9, an anode 10, and a control electrode 11. The control electrode 11 and the cathode 9 are connected to the terminals of the secondary winding of transformer 8, while the anode 10 and cathode 9 are connected through a direct current measuring instrument 12 and the usual output circuit source of voltage 13. A battery 14 may be employed for heating cathodes 9 in parallel, the heating current being made adjustable by adjustable series resistance 15. Suitable negative potentials for the control electrodes 11 can be obtained by connecting the control electrodes to the cathodes through a desired portion of the resistance 16 included in the heating supply leads. In order that the direct current measuring instrument 12, which may be a milliammeter for example, does not respond readily to alternating current potentials, it has been found preferable to make the instrument highly damped by connecting in circuit therewith a large shunt condenser 17, a resistance 18 in series with the instrument and source of voltage, and a resistance 19 in shunt to the instrument.

Although this invention is not limited to the following values, in one case it was found satisfactory to have condenser 17 of the order of 10 to 12 microfarads, resistance 18 approximately 2,000 ohms, and resistance 19 of the order of 50 ohms, since these values will make a milliammeter highly damped when employed in the output circuit of a standard vacuum tube repeater.

Since it is frequently desirable to have the instrument give a zero scale deflection in the absence of signals in line 5, in spite of the space current flowing through said instrument, this invention provides a resistance 20, and a source of voltage 21 so adjusted and poled that the current produced thereby in the instrument is just equal to, and opposite in polarity to the space current flowing through the instrument in the absence of alternating current potentials upon control electrode 11.

With such an arrangement, speech voltages in line 5 will be impressed upon the control electrode 11 and, due to rectification, the space current flowing through the tubes will be increased so that the needle of the instrument 12 will oscillate over its scale at syllable frequency. The amplitude of the swings will be a function of the voltage impressed on the control electrodes or the speech level at the point in the line where the apparatus is connected. By observing the average position of the needle and its movement, a reasonably accurate indication of the speech level may be obtained. In practice, the indicator may be connected to the line at a point beyond a gain control element, so that the latter may be adjusted until the position of the needle and the amplitude of its oscillations correspond to values obtained by previous calibration. This volume indicating device is of special importance in connection with the transmitting equipment, for example, of a radio system, which, as power apparatus, is preferably operated with some consideration for efficiency and will not limit of wide variations in load.

Fig. 2 illustrates a modification of this invention that has been found particularly applicable for the measuring of the volume of speech in a public address system where the line 25, for example, may represent means connecting the output of an amplifier 40 to the loud speaking receivers. As in the arrangement of Fig. 1, a vacuum tube 26 is employed having its input circuit coupled by a step up transformer 27 across the leads 25. The tube 26 has included in its output circuit a direct current measuring instrument 28 which is made highly damped by a shunt resistance 29, a series choke coil 30 and a large condenser 31 shunted around the choke coil and the measuring instrument. Inasmuch as the speech level in the leads 25—25 may vary from time to time under different operating conditions, a plurality of taps 32 are provided for the secondary winding of input transformer 27 and these points may be suitably calibrated to give a wide variation in the speech levels indicated by the measuring instrument 28. In cases of unusually high strength of the speech currents in the line 25 it may be necessary to further reduce the energy impressed on the amplifier 26 in order to get a suitable deflection of the measuring instrument 28 by shunting out an appreciable portion of an inductance 33, for example, which may be connected across the primary winding of transformer 27. As shown in Fig. 2, a switch 34 is provided which can be moved to a position in which the tube 26 will receive only a fractional portion of the strength of the signals in line 25—25.

While the invention has been disclosed as embodied in certain specific arrangements which are deemed desirable, it is to be understood that they are capable of embodiment in many and widely varied forms, without departing from the spirit of the invention as defined in the appended claims.

The invention claimed is:

1. In combination a rectifier having input and output terminals, a source of voltage and a direct current measuring instrument connected in series with said output terminals, and means for making said instrument highly damped comprising a resistance in shunt to said instrument, an impedance in series with the path comprising said instrument and said resistance, and a condenser in shunt to the path comprising said instrument and said impedance.

2. In combination, a vacuum tube amplifier, having input and output terminals, a source of voltage and a milliammeter connected in series with said output terminals, means including a large condenser in shunt to said milliammeter and said source and also including a large resistance in series with said milliammeter and said source for making said milliammeter highly damped, and means including a source of potential connected across the terminals of said milliammeter for impressing upon said milliammeter a potential equal to and opposite in polarity to the potential impressed thereon from said source of voltage in the absence of alternating current potentials impressed upon said input terminals.

3. In combination, a vacuum tube amplifier having input and output terminals, a source of voltage and a milliammeter connected in series with said output terminals, means for making said milliammeter highly damped including a large condenser in shunt to said milliammeter and said source, an impedance element in shunt to said milliammeter and an element having a large impedance to alternating current in series with said milliammeter and said source.

In witness whereof, I hereunto subscribe my name this 25th day of August A. D., 1922.

EDWARD L. NELSON.